April 6, 1937.  W. WOODS  2,076,437
JACKETED COOKING UTENSIL
Filed June 30, 1936
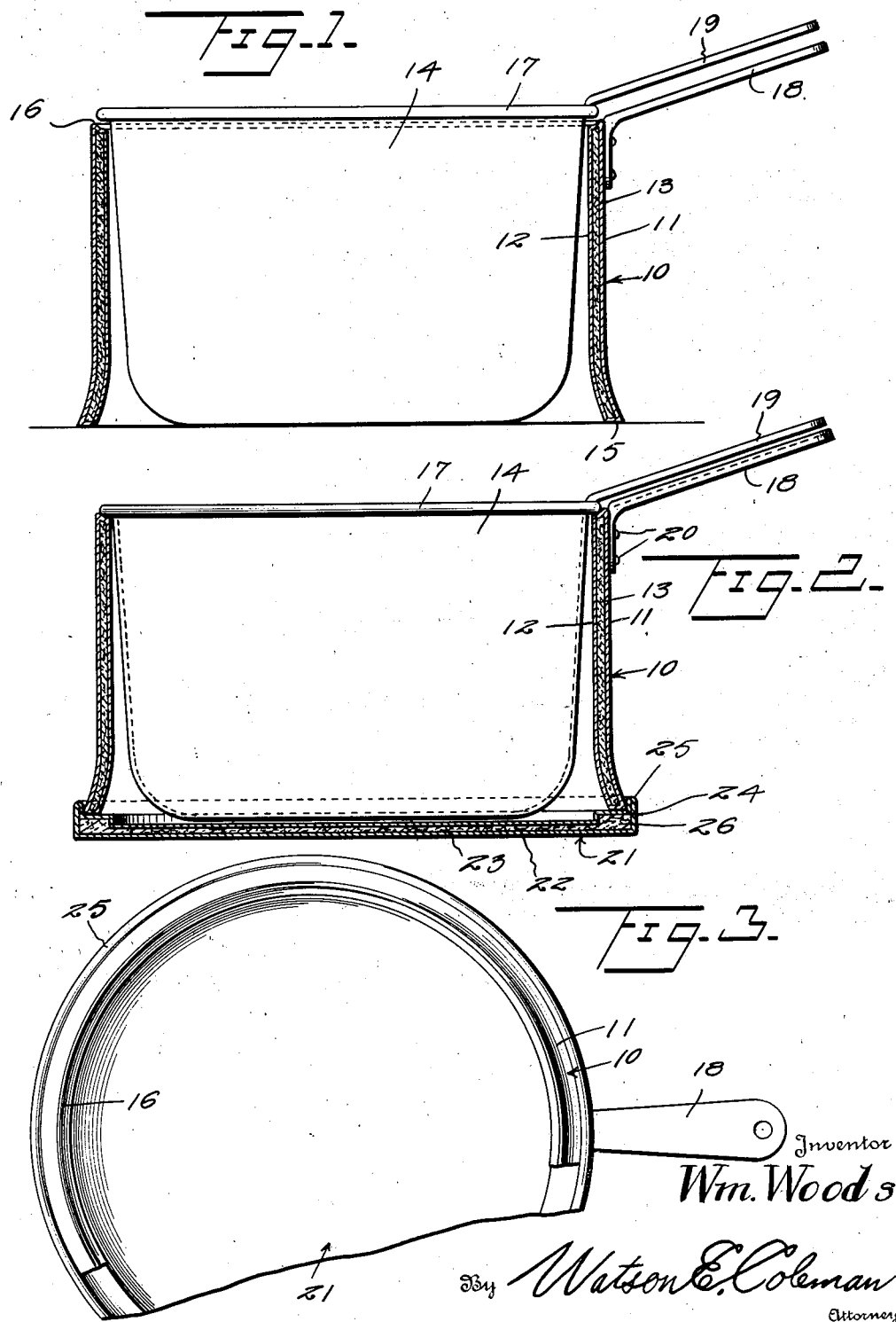

Patented Apr. 6, 1937

2,076,437

UNITED STATES PATENT OFFICE 2,076,437

JACKETED COOKING UTENSIL

William Woods, Riverside, Calif.

Application June 30, 1936, Serial No. 88,242

2 Claims. (Cl. 53—11)

This invention relates to cooking utensils and more particularly to a means for retaining heat within a cooking utensil, both during the cooking of the articles in the utensil and after the heat has been removed from the utensil.

An object of this invention is to provide a combined insulating jacket and a utensil insertible within the interior of the jacket for holding articles to be cooked, the jacket being of such a construction as to hold the heat about the sides of the utensil during the time that the utensil is disposed over a fire, and including means whereby the heat may be retained about the sides and bottom of the utensil when the fire has been cut off or when the utensil has been removed from the stove.

The above and various other objects and advantages of this invention will in part be described in, and in part be understood from the following detail description of the present preferred embodiment, the same being illustrated in the accompanying drawing, wherein:

Figure 1 is a vertical section of an insulating jacket constructed according to an embodiment of this invention having a cooking utensil, shown in side elevation mounted therein.

Figure 2 is a view similar to Figure 1 but showing the jacket and utensil removed from the stove.

Figure 3 is a fragmentary top plan of the heat retaining jacket.

Referring to the drawing wherein like symbols designate corresponding parts throughout the several views, the numeral 10 designates generally an insulated jacket comprising an outer wall 11, and an inner wall 12 which is spaced from the outer wall 11. Insulating material 13, in the form of asbestos or the like, is interposed between the spaced walls 11 and 12, so that the jacket 10 retains heat between the inner wall 12 and the wall of a cooking vessel or pan 14. The lower ends of the outer and inner walls 11 and 12 respectively are flared out, as shown in Figures 1 and 2, and the lower ends thereof are connected together by a bottom wall 15. The upper ends of the outer and inner walls 11 and 12 respectively, are connected together by a top wall 16 which is provided with a concave upper surface so as to snugly receive the bead 17 of the pan 14, as will be hereinafter described.

The jacket 10 has a length substantially less than the depth of the pan 14 so that when the jacket 10 and the pan 14 are placed on the top of the stove, as shown in Figure 1, the rim or bead 17 of the pan 14 will be disposed slightly above the top wall 16 of the jacket 10 in order to permit the circulation of heated air between the pan 14 and the inner wall of the jacket 10.

The jacket 10 is provided with an outstanding handle 18, which is substantially of the same length as a handle 19 carried by the pan 14. The handle 18 is secured to the jacket 10 as by rivets or fastening devices 20.

An insulated bottom member 21 is adapted to receive the jacket 10 and the pan 14 when the fire has been cut off from beneath the pan 14 or when the pan 14 has been removed from the fire. This bottom member 21 comprises a lower plate 22 and an upper or inner plate 23 provided with an enlarged or upwardly offset outer portion 24 terminating in an upwardly extending flange 25. The outer portion 24 is adapted to receive the bottom 15 of the jacket 10, so that when the pan 14 and the jacket 10 are placed on top of the bottom 21, the bottom of the pan 14 will rest on the inner bottom 23 with the rim 17 snugly engaging the seat 16 of the jacket 10. Heat insulating material 26 is interposed between the two bottom members 22 and 23 and may be of asbestos or other suitable heat insulating material.

In the use of this device, when it is desired to cook an article in the pan 14, the article is placed therein and this pan set on top of the stove inside the jacket 10, as shown in Figure 1. The bottom 21 is removed so that the heat can readily contact with the bottom of the pan 14. The heat will rise along the sides of the pan 14 between the sides of the pan and the inner wall 12 of the jacket 10 and then pass out into space between the upper end of the jacket 10 and the rim 17 of the pan 14. After the article or other material has been properly cooked, the pan 14 may be removed from the stove or set to one side on the top thereof, with the pan 14 still retained inside the jacket 10. These two members are then placed on the bottom 21 with the lower end 15 of the jacket 10 engaging on the seat 24 of the bottom 21. In this position, the pan 14 is lowered slightly relative to the jacket 10 so that the rim 17 thereof will snugly engage the concave seat portion 16 on the upper end of the jacket 10. If desired, the pan 14 may have a depth slightly less than the distance between the top wall 16 and the inner bottom wall 23 of the bottom member 21 so that the pan 14 will effectively close the upper end of the jacket 10. The heat from the material in the pan 14 will be retained by the heat insulating jacket 10 and the heat insulating bottom 21 so that the material in the pan 14 will be kept at a relatively hot temperature for a considerable length of time.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. In combination, an annular heat insulating member open at the top and the bottom, a removable bottom for said member provided with a recess in the upper surface thereof, an upstanding flange carried by the bottom and engageable about the lower end of the member, and a vessel engageable within the member and provided with an outstanding rim adapted to rest on the upper edge of the member with the bottom of the vessel disposed in said recess, said vessel having a depth in excess of the depth of the heat insulating member.

2. In combination, a substantially cylindrical heat insulating member provided with a flared lower end portion, a handle carried by the member, a removable bottom engaging the lower end of the member and provided with a recess in the upper surface thereof, an upstanding flange carried by the bottom and engageable about the lower edge of the member, and a vessel adapted to be disposed within the member and provided with an outstanding rim on the upper edge thereof, said member having a rim seat on the upper edge thereof whereby to snugly receive said rim, said vessel having a depth in excess of the height of the cylindrical member whereby the rim of the vessel will be disposed in upwardly spaced relation to the upper edge of the cylindrical member when the lower edge of the cylindrical member is resting on a plane surface and the bottom of the vessel engaging within the recess of the removable bottom when the cylindrical member is resting on the bottom and the rim of the vessel engages the upper edge of the cylindrical member.

WILLIAM WOODS.